(12) United States Patent
Ooshita et al.

(10) Patent No.: US 10,352,630 B2
(45) Date of Patent: Jul. 16, 2019

(54) HEAT EXCHANGER AND HOT WATER APPARATUS

(71) Applicant: NORITZ CORPORATION, Hyogo (JP)

(72) Inventors: Wataru Ooshita, Himeji (JP); Masaya Tateyama, Akashi (JP); Yukiko Noguchi, Kakogawa (JP)

(73) Assignee: NORITZ CORPORATION, Hyogo (JP)

( * ) Notice: Subject to any disclaimer, the term of this patent is extended or adjusted under 35 U.S.C. 154(b) by 37 days.

(21) Appl. No.: 15/374,423

(22) Filed: Dec. 9, 2016

(65) Prior Publication Data
US 2017/0184349 A1 Jun. 29, 2017

(30) Foreign Application Priority Data
Dec. 25, 2015 (JP) .................. 2015-252781

(51) Int. Cl.
| | |
|---|---|
| *F28F 1/32* | (2006.01) |
| *F24D 17/00* | (2006.01) |
| *F24D 17/02* | (2006.01) |
| *F24H 1/41* | (2006.01) |
| *F28D 7/00* | (2006.01) |
| *F28D 7/08* | (2006.01) |

(Continued)

(52) U.S. Cl.
CPC .......... *F28F 1/325* (2013.01); *F24D 17/0036* (2013.01); *F24D 17/02* (2013.01); *F24H 1/41* (2013.01); *F28D 7/0075* (2013.01); *F28D 7/0091* (2013.01); *F28D 7/087* (2013.01); *F28D 21/0007* (2013.01); *F28F 19/00* (2013.01); *F28F 2265/10* (2013.01); *Y02B 10/20* (2013.01); *Y02B 10/70* (2013.01)

(58) Field of Classification Search
CPC .. F28D 1/0477; F28D 2021/0073; F28F 1/24; F28F 1/30; F28F 1/32; F28F 1/40; F28F 1/325; F24H 9/00
USPC .......................... 122/15.1, 18.1, 32, 33, 31.1
See application file for complete search history.

(56) References Cited

U.S. PATENT DOCUMENTS

| | | | | |
|---|---|---|---|---|
| 2009/0321059 A1* | 12/2009 | Kitazawa | ............... | F24F 1/0059 165/181 |
| 2011/0155079 A1* | 6/2011 | Matsunaga | ............... | F24H 1/40 122/15.1 |
| 2014/0190425 A1* | 7/2014 | Oohigashi | ............. | F24H 9/0031 122/18.4 |

FOREIGN PATENT DOCUMENTS

| | | | |
|---|---|---|---|
| JP | 2001-082808 A | | 3/2001 |
| JP | 2001082808 A | * | 3/2001 |
| JP | 2014185830 A | * | 10/2014 |

* cited by examiner

*Primary Examiner* — Steven B McAllister
*Assistant Examiner* — Ko-Wei Lin
(74) *Attorney, Agent, or Firm* — Studebaker & Brackett PC

(57) ABSTRACT

According to the present invention, a heat exchanger comprises a fin having a plurality of through holes. The plurality of through holes include mutually adjacent first and second through holes disposed on a side closest to a heating gas's inlet side. The fin has a slit located between the first through hole and the second through hole and cut into the fin from an edge thereof located on the heating gas's inlet side to a side farther from the heating gas's inlet side than a reference line connecting a center of the first through hole and a center of the second through hole. Furthermore, the fin has at least one opening between the slit and the first and second through (Continued)

holes. The opening includes a first opening having a portion located on the side farther from the heating gas's inlet side than the reference line.

8 Claims, 9 Drawing Sheets

(51) Int. Cl.
*F28D 21/00* (2006.01)
*F28F 19/00* (2006.01)

HEAT EXCHANGER AND HOT WATER APPARATUS

BACKGROUND OF THE INVENTION

Field of the Invention

The present invention relates to a heat exchanger and a hot water apparatus.

Description of the Background Art

It is known that, in a heat exchanger used for a hot water apparatus etc., in order to suppress excessive heating of heat transfer tubes at a portion in contact with hot heating gas of high temperature to suppress boiling, scaling, damage, etc. inside the heat transfer tubes, a heat exchange suppression means is provided (see Japanese Patent Laying-Open No. 2001-82808).

Specifically, Japanese Patent Laying-Open No. 2001-82808 describes that as a heat exchange means a metal plate having low thermal conductivity is provided for the heat transfer tubes on an upstream side as seen in a direction in which heating gas (combustion gas) flows (hereinafter also simply referred to as "the upstream side") or in a fin (a heat transfer fin) a plurality of holes are provided on the upstream side of the heat transfer tubes, etc.

SUMMARY OF THE INVENTION

In order to enhance a heat exchanger in efficiency of heat transfer, a slit may be provided at an end of a fin located closer to a side into which heating gas flows. The slit is located between two adjacent heat transfer tubes and cut into the fin from the inlet-side end toward a downstream side of the flow of heating gas (hereinafter also simply referred to as "the downstream side"). In order to enhance efficiency of heat transfer, it is desirable to shape the slit to be cut toward the downstream side more deeply.

However, as a result of a study of the present inventors, it has been found that when the slit is shaped to be further deeply cut toward the downstream side, a fin around the heat transfer tubes may be heated to high temperature at a portion of the heat transfer tubes other than the upstream side (a portion of the heat transfer tubes on the downstream side with reference to the center of the heat transfer tubes). Thus it is believed that suppressing the heat exchange from heating gas only on the combustion gas's upstream side of the heat transfer tubes cannot sufficiently suppress excessive heating of the heat transfer tubes, and hence scaling inside the heat transfer tubes.

Furthermore, when the water which flows through the heat transfer tubes is hard water, in particular, scaling easily occurs at a high temperature portion. Deposition of scale invites reduction in efficiency of heat transfer and the heat transfer tubes may crack or break over time and leakage of water may occur. Accordingly, when the water which flows through the heat transfer tubes is hard water, there is a need for more reliably suppressing occurrence of scaling inside the heat transfer tubes.

The present invention has been made in view of the above issue, and an object thereof is to provide a heat exchanger and hot water apparatus which can suppress occurrence of scaling inside heat transfer tubes while having high efficiency of heat transfer.

The heat exchanger of the present invention comprises: a case allowing heating gas to be flowed therein; a fin disposed inside the case and having a plurality of through holes; and heat transfer tubes inserted through the plurality of through holes and passing water. The plurality of through holes include mutually adjacent first and second through holes disposed on a side closest to a heating gas's inlet side in a direction in which heating gas flows.

The fin has a slit located between the first through hole and the second through hole and cut into the fin from an edge thereof located on the heating gas's inlet side to a side farther from the heating gas's inlet side than a reference line connecting a center of the first through hole and a center of the second through hole. Furthermore, the fin has at least one opening between the slit and the first and second through holes. The opening includes a first opening having a portion located on the side farther from the heating gas's inlet side than the reference line.

The heat exchanger of the present invention has high efficiency of heat transfer by using a fin having a slit as described above. Furthermore, by providing the above opening to a portion of the fin having the slit that easily reaches high temperature, excessive heating of the heat transfer tubes can be suppressed and occurrence of scaling inside the heat transfer tubes can be suppressed.

The above heat exchanger further comprises an exhaust collection and guide member which covers the case on a side allowing heating gas to be exhausted and has an exhaust port for heating gas. The slit is provided in a range overlapping an opening portion of the exhaust port in the direction in which heating gas flows (a range A shown in FIG. 8 and FIG. 6, as will be described hereinafter), and the fin has a notch cut toward at least any of the first and second through holes. The notch has a portion located on the side farther from the heating gas's inlet side than the reference line. This can more reliably suppress excessive heating of the heat transfer tubes.

In the above heat exchanger, the first through hole is a through hole disposed at a most downstream side, as seen in a direction in which the heat transfer tubes pass water, of the plurality of through holes disposed on the side closest to the heating gas's inlet side in the direction in which heating gas flows, and the fin has a notch cut toward at least any of the first and second through holes. The notch has a portion located on the side farther from the heating gas's inlet side than the reference line. This can more reliably suppress excessive heating of the heat transfer tubes.

In the above heat exchanger, the fin at an edge thereof located on the heating gas's inlet side has another slit other than the slit and the other slit does not have a notch. This can more reliably suppress excessive heating of the heat transfer tubes while maintaining efficiency of heat transfer in the heat transfer tubes moderately.

In the above heat exchanger, the opening further includes a second opening located on a side closer to the heating gas's inlet side than the reference line. This can more reliably suppress excessive heating of the heat transfer tubes.

In the above heat exchanger, the first opening has an opening area larger than that of the second opening. This can more reliably suppress excessive heating of the heat transfer tubes while maintaining efficiency of heat transfer in the heat transfer tubes moderately.

Furthermore, the present invention also relates to a hot water apparatus comprising the above heat exchanger and a burner generating heating gas. This hot water apparatus also has an effect similar to that of the above heat exchanger.

Thus the present invention can provide a heat exchanger and hot water apparatus which can suppress occurrence of scaling inside heat transfer tubes while having high efficiency of heat transfer.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

<First Embodiment>

Hereinafter, one embodiment of the present invention will be described based on figures. Initially, a configuration of a hot water apparatus including a heat exchanger in the present embodiment will be described using FIG. 1 to FIG. 3.

Figure 1:
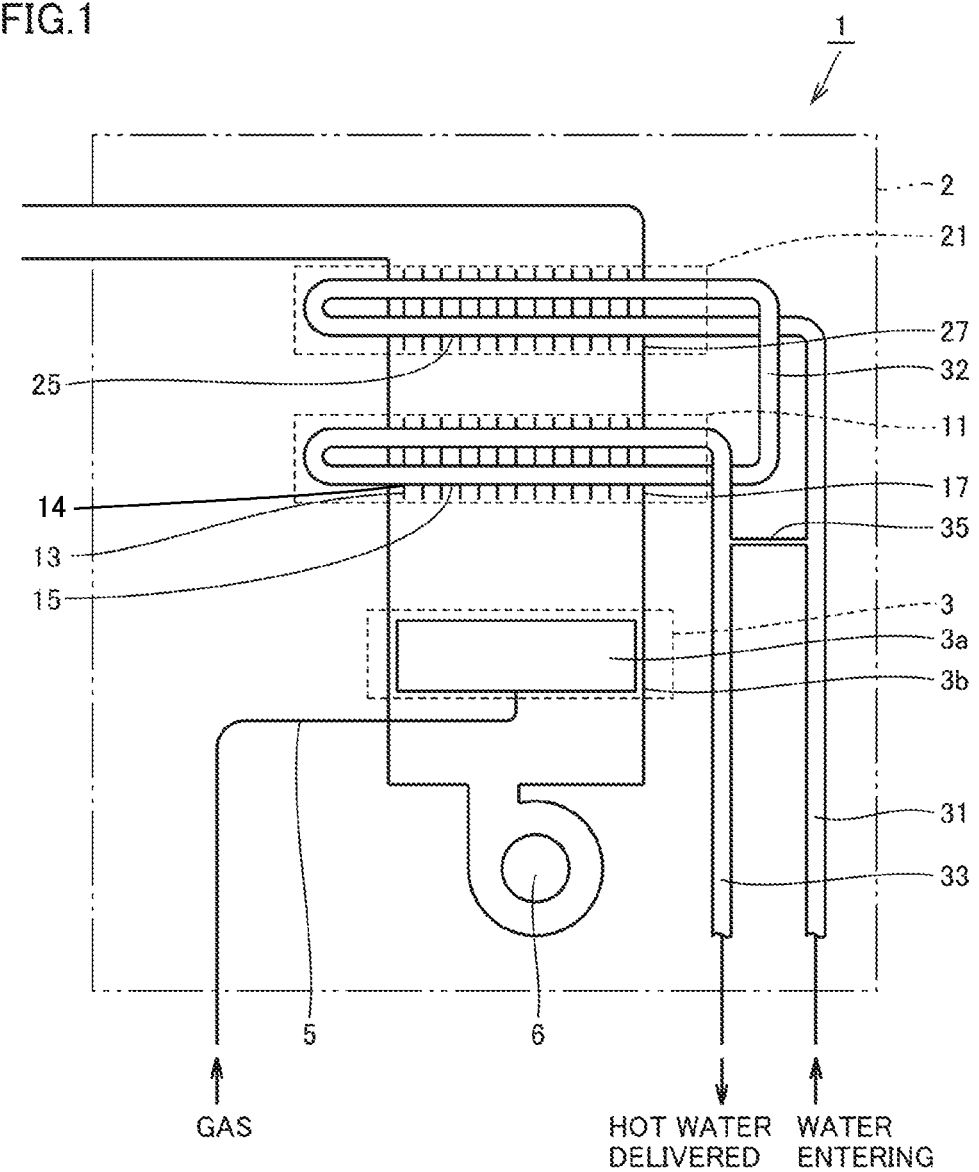
FIG. 1 is a schematic diagram showing a configuration of a hot water apparatus according to a first embodiment.
Figure 2:
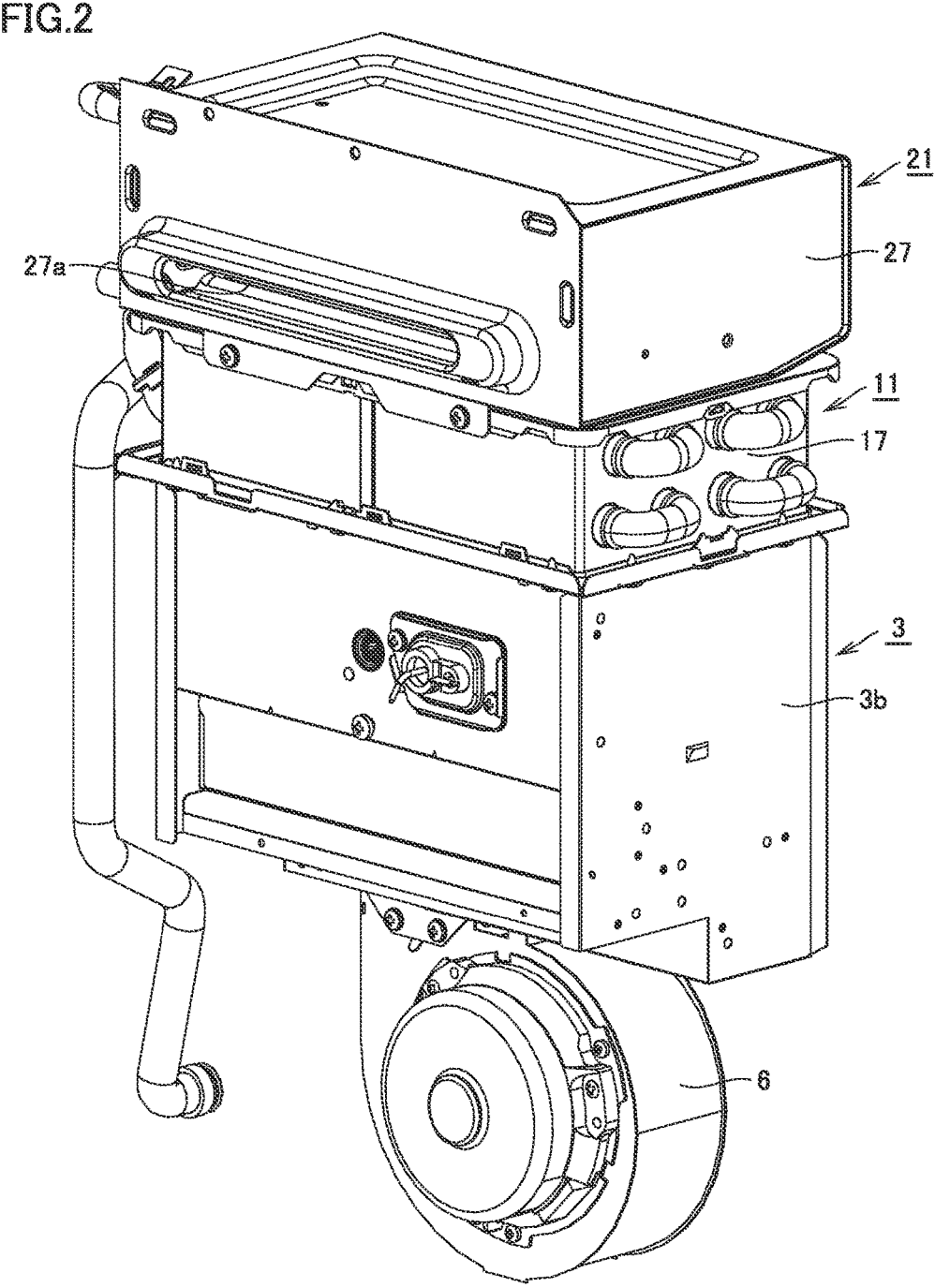
FIG. 2 is a perspective view of a configuration of a fan unit, a combustor, a primary heat exchanger and a secondary heat exchanger of the hot water apparatus according to the first embodiment.

With reference to FIG. 1 and FIG. 2, a hot water apparatus 1 of the present embodiment (such as a water heating apparatus, a heating apparatus, etc.) mainly has a body case 2, a burner 3, a fan unit 6, a primary heat exchanger 11, and a secondary heat exchanger 21. Burner 3 is for supplying heating gas (combustion gas). This burner 3 has a combustion unit 3a, and a burner case 3b, and combustion unit 3a is accommodated in burner case 3b. A gas pipe 5 for supplying a fuel gas to burner 3 is connected to this burner 3.

Fan unit 6 is for supplying combustion air to burner 3, and for example has a fan, a fan case, a fan motor, etc. This fan unit 6 is attached to a lower portion of burner 3.

Primary heat exchanger 11 and secondary heat exchanger 21 are each for performing heat exchange by heating gas supplied from burner 3. Primary heat exchanger 11 is attached on burner 3, and secondary heat exchanger 21 is attached on primary heat exchanger 11.

Primary heat exchanger 11 and secondary heat exchanger 21 are connected by a pipe 32. A water supply pipe 31 for supplying water to secondary heat exchanger 21 is connected to secondary heat exchanger 21. A hot water delivery pipe 33 for delivering water from primary heat exchanger 11 is connected to primary heat exchanger 11.

A bypass pipe 35 is connected between water supply pipe 31 and hot water delivery pipe 33. This bypass pipe 35 is for adjusting the temperature of the water delivered from hot water delivery pipe 33 using water of water supply pipe 31.

Figure 3:
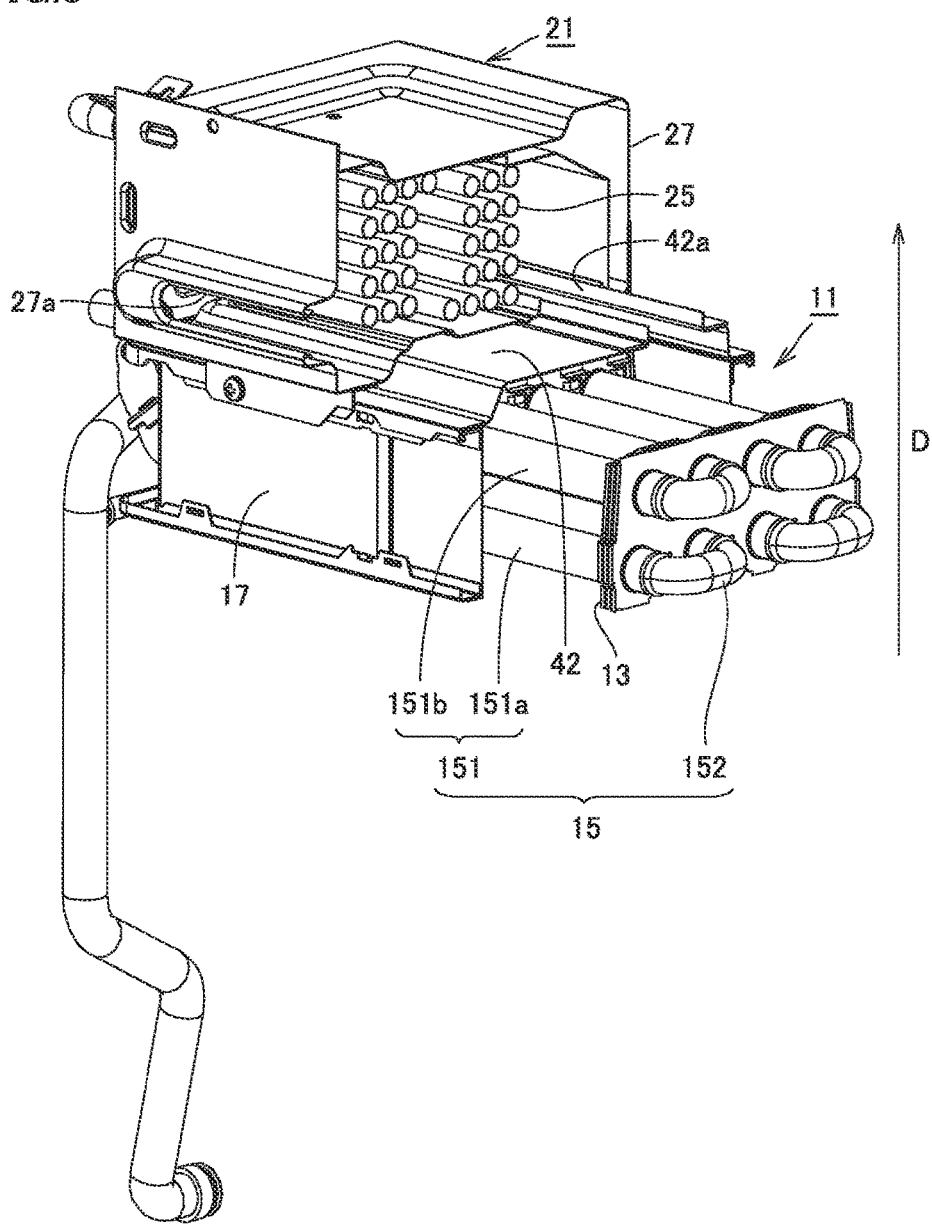
FIG. 3 is a partially explored perspective view of a configuration of the primary and secondary heat exchangers of the hot water apparatus according to the first embodiment.

With reference to FIG. 1 and FIG. 3, primary heat exchanger 11 has a plurality of mutually spaced fins 13, heat transfer tubes 15 penetrating the plurality of fins 13, and a case 17 accommodating the plurality of fins 13 and heat transfer tubes 15 therein. Heating gas heated by burner 3 is introduced into case 17.

Heat transfer tubes 15 each have one end connected to pipe 32 and the other end connected to hot water delivery pipe 33. Thus, water flows through heat transfer tubes 15. Note that heat transfer tubes 15 include a plurality of in-case tubes 151 having a portion located inside the case, and a plurality of connecting tubes 152 which connect the plurality of in-case tubes 151 outside the case. The in-case tubes include a plurality of in-case tubes 151a disposed on a side closest to the heating gas's inlet side (or on the side of burner 3), and a plurality of in-case tubes 151b disposed on a side farther from the heating gas's inlet side than in-case tubes 151a.

Furthermore, secondary heat exchanger 21 has a plurality of (e.g., spiral) heat transfer tubes 25 and a case 27 in which heat transfer tubes 25 are accommodated. Heat transfer tubes 25 each have one end connected to water supply pipe 31 and the other end connected to pipe 32.

Note that in the present embodiment, the heat exchanger according to the present invention corresponds to primary heat exchanger 11, and it does not correspond to secondary heat exchanger 21.

With reference to FIG. 3, exhaust collection and guide member 42 is disposed between primary heat exchanger 11 and secondary heat exchanger 21. Exhaust collection and guide member 42 covers a heat exchanger on a side opposite to that on which the burner for the heat exchanger is disposed. Exhaust collection and guide member 42 is provided with an exhaust port 42a for causing heating gas to be exhausted from the heat exchanger (i.e., supplying secondary heat exchanger 21 with heating gas having passed through primary heat exchanger 11) (see FIG. 8). Furthermore, case 27 of secondary heat exchanger 21 is provided with an exhaust port 27a for exhausting heating gas.

A characteristic configuration of the heat exchanger (primary heat exchanger 11) of the present embodiment will now be described using FIG. 4 and FIG. 5.

Figure 4:
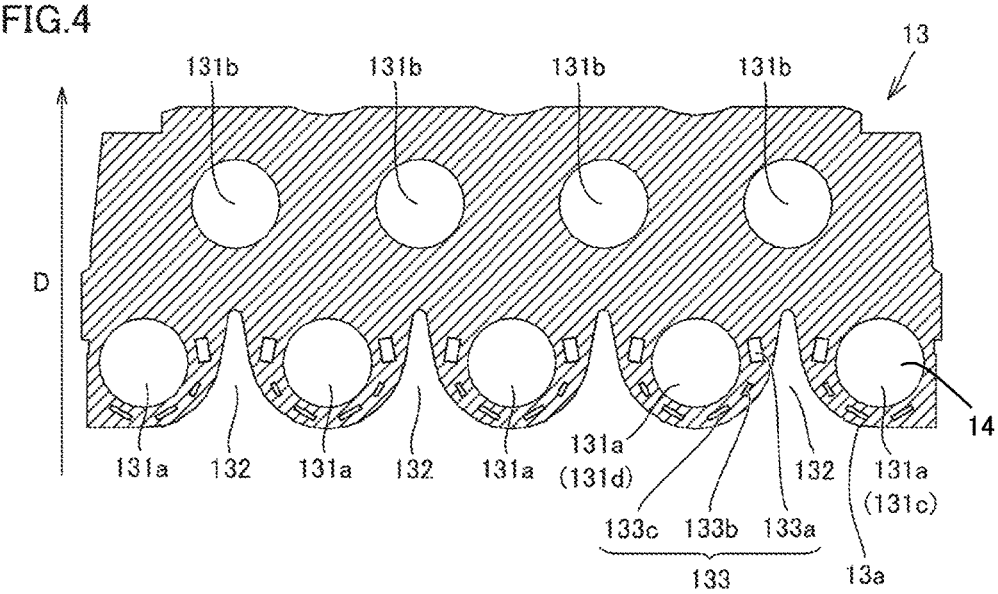
FIG. 4 is a front view of a configuration of a fin according to the first embodiment.

With reference to FIG. 4, each fin 13 is a plate-like member having a plurality of through holes 131a and 131b. Heat transfer tubes 15 are inserted through the plurality of through holes 131a, 131b and thus penetrate the plurality of fins 13. Note that heat transfer tubes 15 are brazed to a periphery of each of the plurality of through holes 131a and 131b.

The plurality of through holes 131a and 131b, as seen in a direction D in which heating gas flows, includes a through hole 131a of a first stage disposed on a side closest to the heating gas's inlet side (or on the side of burner 3) (a side opposite to arrow D), and a through hole 131b of a second stage disposed on a side farther from the heating gas's inlet side than through hole 131a of the first stage. Through hole 131a of the first stage includes mutually adjacent first through hole 131c and second through hole 131d.

Figure 8:
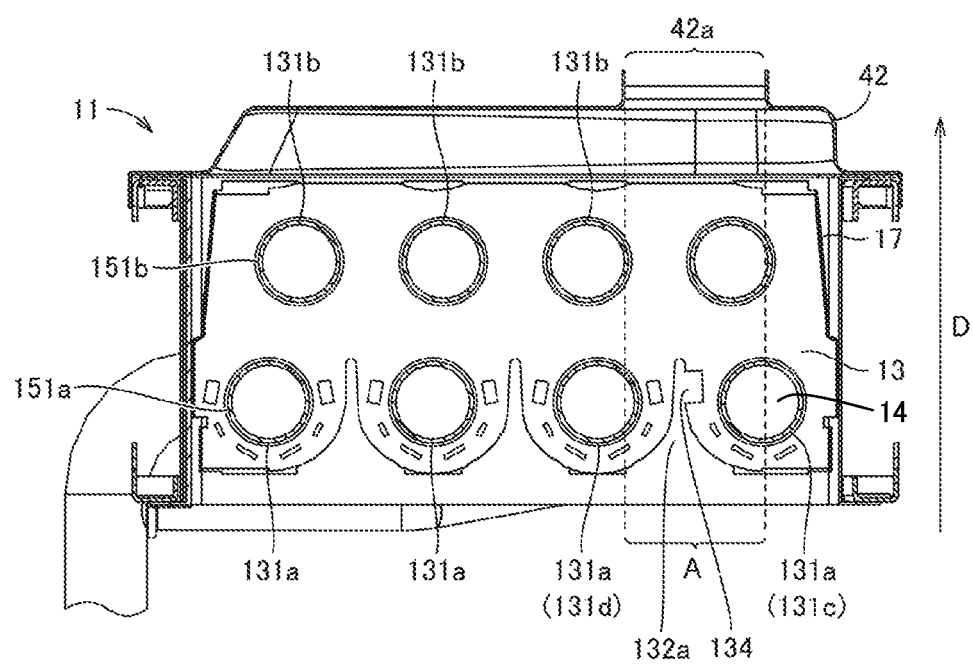
FIG. 8 is a cross section of a configuration of a primary heat exchanger and an exhaust collection and guide member of a hot water apparatus according to the second embodiment.
Figure 9:
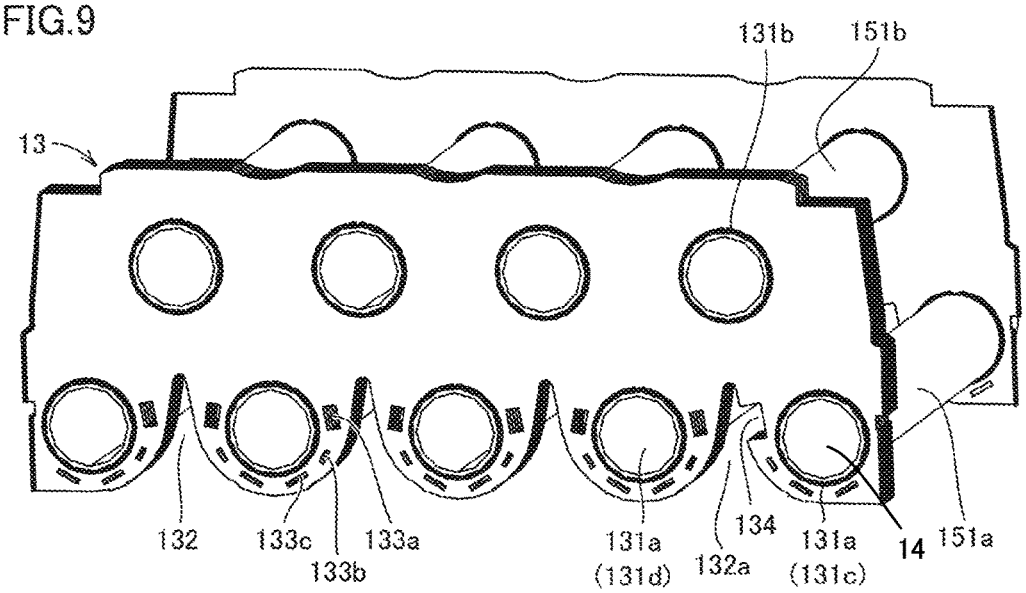
FIG. 9 is a perspective view of a configuration of the fin and heat transfer tubes according to the second embodiment.

Note that in-case tubes 151a of heat transfer tubes 15 are inserted through through hole 131a of the first stage, and in-case tubes 151b of heat transfer tubes 15 are inserted through through hole 131b of the second stage (see FIG. 3, FIG. 8, and FIG. 9).

Figure 5:
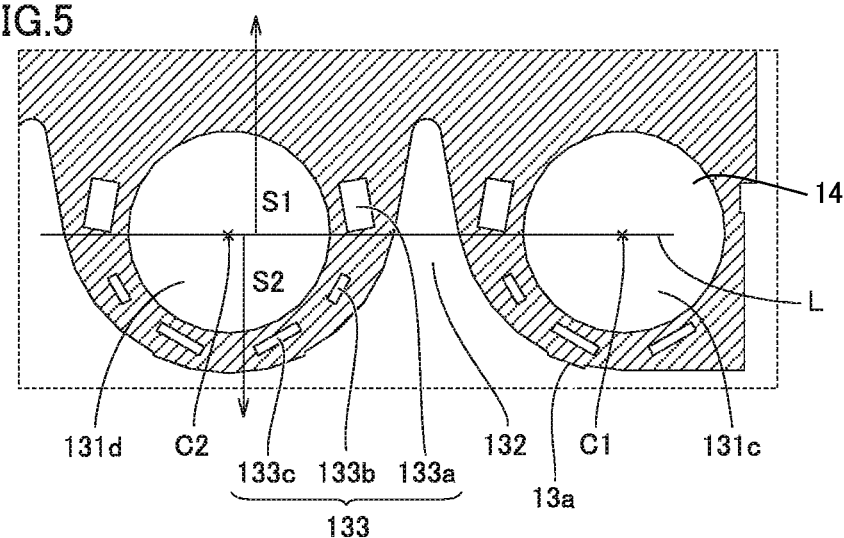
FIG. 5 is a partial enlarged view of the fin shown in FIG. 4.

With reference to FIG. 5, which is a partial enlarged view of the fin shown in FIG. 4, fin 13 has a slit 132 located between first through hole 131c and second through hole 131d and cut into the fin from an edge 13a thereof located on the heating gas's inlet side. Note that slit 132 is cut to a side S1 farther from the heating gas's inlet side than a reference line L which connects a center C1 of first through hole 131c and a center C2 of second through hole 131d. Slit 132 thus deeply cut helps to transfer the heating gas's heat to the heat transfer tubes of the second stage having a relatively low temperature (i.e., in-case tubes 151b) and can thus enhance the heat exchanger's total efficiency of heat transfer.

And fin 13 has an opening 133 between slit 132 and first and second through holes 131c and 131d. Note that opening 133 includes a first opening 133a having a portion located on side S1 farther from the heating gas's inlet side than reference line L. First opening 133a is provided at a position which is a site having a tendency in which when slit 132 is deeply cut as described above fin 13 has the highest temperature. The opening provided at such a site suppresses heat conduction from the edge of slit 132 to heat transfer tubes and can suppress excessive heating of heat transfer tubes 15 (in-case tubes 151a) inserted through first through hole 131c and second through hole 131d.

Opening 133 further includes second openings 133b, 133c located on a side S2 closer to the heating gas's inlet side than reference line L. This can suppress heat conduction of a portion at which fin 13 has a temperature which is highest second to that of the position of the first opening, and can thus more reliably suppress excessive heating of heat transfer tubes 15 (in-case tubes 151a) inserted through first through hole 131c and second through hole 131d.

Note that first opening 133a has an opening area larger than that of second openings 133b and 133c. This is because when these openings 133 are absent, fin 13 normally has the highest temperature at a portion otherwise provided with first opening 133a and has lower temperature at a portion otherwise provided with second openings 133b and 133c. Thus, excessive heating of heat transfer tubes 15 inserted through first through hole 131c and second through hole 131d can be suppressed while a balance of heat conduction in accordance with a temperature distribution of fin 13 is appropriately adjusted and entire conduction efficiency is maintained.

Note that second opening 133b has an opening area smaller than that of second opening 133c. This is because when opening 133 is absent, fin 13 has a lower temperature at a portion otherwise provided with second opening 133b than at a portion otherwise provided with second opening 133c. Thus, excessive heating of heat transfer tubes 15 inserted through first through hole 131c and second through hole 131d can be suppressed while a balance of heat conduction in accordance with a temperature distribution of fin 13 is more appropriately adjusted and entire conduction efficiency is maintained.

<Second Embodiment>

Figure 6:
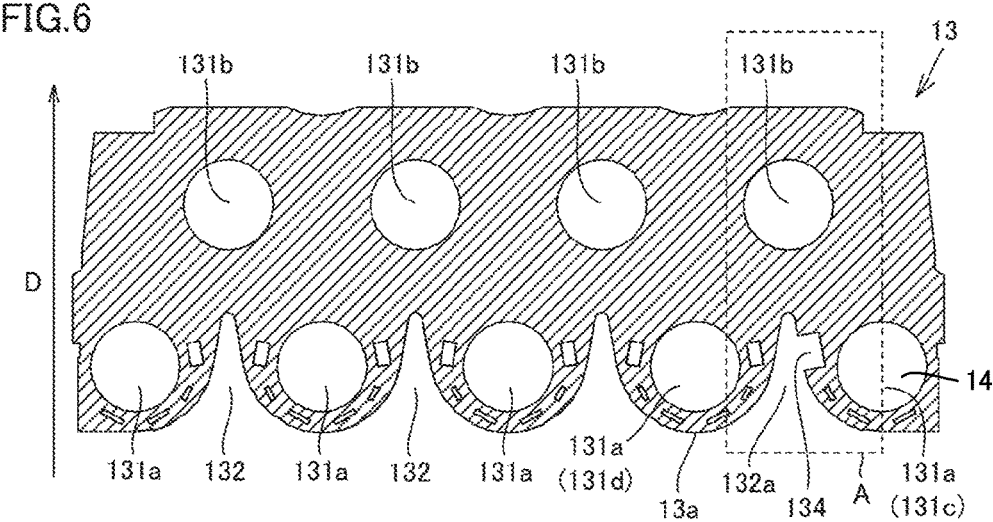
FIG. 6 is a front view of a configuration of a fin according to a second embodiment.

With reference to FIG. 6, the present embodiment provides a heat exchanger (primary heat exchanger 11) different from the first embodiment in that a slit 132a has a notch 134. The remainder of the present embodiment is similar to that of the first embodiment and accordingly, will not be described repeatedly.

With reference to FIG. 6, FIG. 8, and FIG. 9, slit 132a is provided in a range overlapping an opening portion of exhaust port 42a in direction D in which heating gas flows (a range A shown in FIG. 8 and FIG. 6), and slit 132a has notch 134 cut toward first through hole 131c. In such a range A, heating gas flows in a relatively large amount, and accordingly, fin 13 around slit 132a in such a position more easily attains high temperature than a fin around another slit. The area of fin 13 of this portion can be further reduced by providing the notch than by providing an opening, which can more reliably suppress excessive heating of heat transfer tubes 15 inserted through first through hole 131c.

Figure 7:
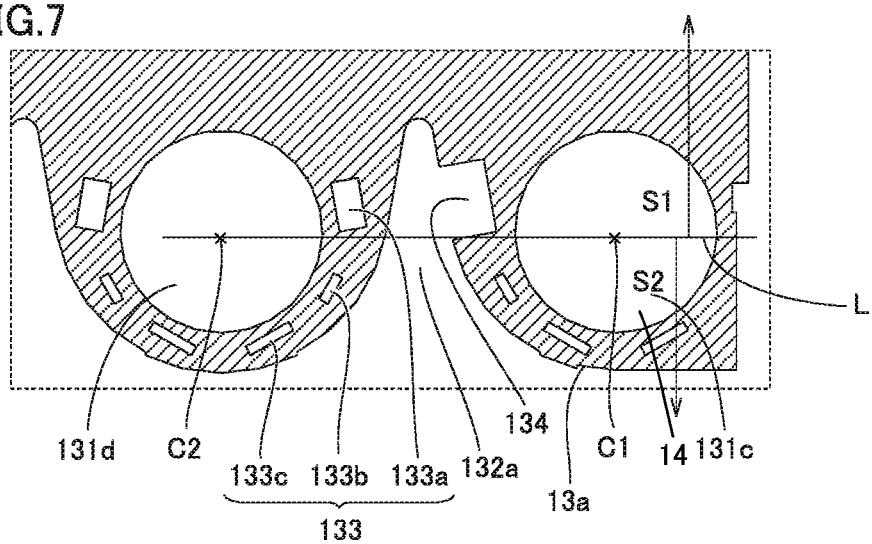
FIG. 7 is a partial enlarged view of the fin shown in FIG. 6.

Note, however, that with reference to FIG. 7, which is a partial enlarged view of FIG. 6, notch 134 needs to have a portion located on side Si farther from the heating gas's inlet side than reference line L. If the notch should be located on side S2 closer to the heating gas's inlet side, this portion has no fin 13 and accordingly, heating gas directly contacts heat transfer tubes 15 (in-case tubes 151a) easily and heating of heat transfer tubes 15 would rather be promoted. In contrast, when notch 134 is provided to have a portion located on S1, the direction in which heating gas flows is not that in which notch 134 extends toward heat transfer tubes 15, and heat conduction by fin 13 is more dominant than an amount of direct heating of heat transfer tubes 15 by heating gas. Accordingly, by using notch 134 to suppress heat conduction done by fin 13, excessive heating of heat transfer tubes 15 can be suppressed.

Furthermore, first through hole 131c is a through hole disposed on the most downstream side 14 of heat transfer tubes 15 of a plurality of through holes disposed, as seen in the direction in which heating gas flows, on a side closest to the heating gas's inlet side, i.e., through holes 131a of the first stage. Slit 132a is provided between such a first through hole 131c and an adjacent second through hole 131d, and has notch 134 cut toward first through hole 131c. Heat transfer tubes 15 (in-case tubes 151a) inserted through a plurality of through holes 131a disposed on a side closest to the heating gas's inlet side have higher temperature than heat transfer tubes 15 (in-case tubes 151b) inserted through other through holes 131b. Inter alia, a more downstream side 14 of heat transfer tubes 15 has water higher in temperature by heat conduction. Accordingly, of in-case tubes 151a, the most downstream side 14 of heat transfer tubes 15 (i.e., in-case tubes 151a inserted through first through hole 131c) has the highest temperature among the plurality of in-case tubes 151a and 151b. Notch 134 provided to fin 13 around slit 132a located in such a position can more reliably suppress excessive heating of heat transfer tubes 15 (i.e., in-case tubes 151a inserted through first through hole 131c).

Furthermore, fin 13 at edge 13a located on the heating gas's inlet side has another slit 132 other than slit 132a and the other slit 132 does not have a notch, since fin 13 around the other slit 132 normally has lower temperature than that around slit 132a. Thus, excessive heating of heat transfer tubes 15 can be suppressed while a balance of heat conduction in accordance with a temperature distribution of fin 13 is appropriately adjusted and entire conduction efficiency is maintained.

While the present invention has been described in embodiments, it should be understood that the embodiments disclosed herein are illustrative and non-restrictive in any respect. The scope of the present invention is defined by the terms of the claims, and is intended to include any modifications within the meaning and scope equivalent to the terms of the claims.

What is claimed is:

1. A heat exchanger comprising:
   a case allowing heating gas to be flowed therein;
   a fin disposed inside the case and having a plurality of through holes; and
   heat transfer tubes inserted through the plurality of through holes and passing water,
   the plurality of through holes including mutually adjacent first and second through holes disposed on a side closest to a heating gas's inlet side in a direction in which heating gas flows, the first through hole having a first radius and the second through hole having a second radius, the fin having a slit located between the first through hole and the second through hole and cut into the fin from an edge of the fin located on the heating gas's inlet side to a side farther from the heating gas's inlet side than a reference line connecting a center of the first through hole and a center of the second through hole plus at least a length of one of the first radius and second radius in the direction in which heating gas flows from a respective center of the first through hole and the second through hole, the fin having at least one opening, the at least one opening including a first opening, and the first opening is positioned at a location that is between the first and second through holes and between the slit and one of the first and second through holes, and has a portion located on the side farther from the heating gas's inlet side than the reference line.

2. The heat exchanger according to claim 1, further comprising an exhaust collection and guide member which covers the case on a side allowing the heating gas to be exhausted and has an exhaust port for heating gas, wherein:

the slit is provided in a range overlapping an opening portion of the exhaust port in the direction in which heating gas flows, and the fin has a notch cut toward at least any of the first and second through holes; and the notch has a portion located on the side farther from the heating gas's inlet side than the reference line.

3. The heat exchanger according to claim 1, wherein:

the first through hole is a through hole disposed at a most downstream side, as seen in a direction in which the heat transfer tubes pass water, of the plurality of through holes disposed on the side closest to the heating gas's inlet side in the direction in which the heating gas flows, and the fin has a notch cut toward at least any of the first and second through holes; and the notch has a portion located on the side farther from the heating gas's inlet side than the reference line.

4. The heat exchanger according to claim 2, wherein the edge of the fin-located on the heating gas's inlet side has another slit other than the slit and the another slit does not have a notch.

5. The heat exchanger according to claim 3, wherein the edge of the fin located on the heating gas's inlet side has another slit other than the slit and the-another slit does not have a notch.

6. The heat exchanger according to claim 1, wherein the opening further includes a second opening located on the side closer to the heating gas's inlet side than the reference line.

7. The heat exchanger according to claim 6, wherein the first opening has an opening area larger than that of the second opening.

8. A hot water apparatus comprising the heat exchanger according to claim 1 and a burner generating heating gas.

* * * * *